United States Patent [19]
Goodrum et al.

[11] Patent Number: 6,098,137
[45] Date of Patent: Aug. 1, 2000

[54] FAULT TOLERANT COMPUTER SYSTEM

[75] Inventors: Alan L. Goodrum, Tomball; John M. MacLaren, Cypress, both of Tex.

[73] Assignee: Computer Corporation

[21] Appl. No.: 08/882,504

[22] Filed: Jun. 25, 1997

Related U.S. Application Data

[63] Continuation-in-part of application No. 08/658,750, Jun. 5, 1996, Pat. No. 6,032,271.

[51] Int. Cl.⁷ ..................................................... G06F 11/08
[52] U.S. Cl. .............................. 710/129; 370/402; 714/43
[58] Field of Search ............................... 395/308, 183.19, 395/185.09; 371/20.5; 710/128, 129, 130; 370/402; 714/43, 56, 716

[56] References Cited

U.S. PATENT DOCUMENTS

| | | | |
|---|---|---|---|
| 4,597,084 | 6/1986 | Dynneson et al. ....................... | 714/805 |
| 4,953,074 | 8/1990 | Kametani et al. . | |
| 5,289,589 | 2/1994 | Bingham et al. ........................ | 710/128 |
| 5,293,586 | 3/1994 | Yamazaki et al. ...................... | 395/519 |
| 5,404,465 | 4/1995 | Novakovich ............................ | 395/290 |
| 5,471,482 | 11/1995 | Byers et al. ............................ | 371/21.2 |
| 5,568,437 | 10/1996 | Jamal ...................................... | 365/201 |
| 5,581,482 | 12/1996 | Wiedenman et al. .............. | 364/551.01 |
| 5,737,338 | 4/1998 | Eguchi .................................... | 371/20.5 |
| 5,754,804 | 5/1998 | Cheselka et al. ....................... | 710/126 |
| 5,771,359 | 6/1998 | Galloway et al. ...................... | 395/308 |
| 5,784,558 | 7/1998 | Emerson et al. ..................... | 395/200.6 |
| 5,809,021 | 9/1998 | Diaz et al. .............................. | 370/364 |
| 5,812,816 | 9/1998 | Parady .................................... | 395/492 |
| 5,838,899 | 11/1998 | Leavitt et al. ..................... | 395/185.09 |
| 5,838,931 | 11/1998 | Regenold et al. ...................... | 395/308 |
| 5,857,116 | 1/1999 | Ayash et al. ............................ | 395/869 |

*Primary Examiner*—Paul R. Myers
*Attorney, Agent, or Firm*—Sharp, Comfort & Merrett, P.C.

[57] ABSTRACT

A computer system includes an apparatus which enables transactions directed to a particular target device such as one situated inside a bridge to be shunted directly to the device without requiring that the transaction actually proceed to the device through a bus on which the device is located. However, the transaction may, in fact, also be run on the bus on which the device is located, the ID select for the target device may be masked. In this way, it is possible to run transactions to a particularly critical device even when the bus on which it is located is, for one reason or another, not operating.

12 Claims, 9 Drawing Sheets

PCI BUS READ

PCI BUS WRITE

FAULT TOLERANT COMPUTER SYSTEM

CROSS-REFERENCE TO RELATED APPLICATION

This is a continuation-in-part of U.S. patent application Ser. No. 08/658,750, now U.S. Pat. No. 6,032,271 filed on Jun. 5, 1996.

FIELD OF THE INVENTION

This invention relates generally to computer systems with bus-to-bus bridges, and particularly to computer systems that can continue to operate after hardware or software faults occur.

BACKGROUND OF THE INVENTION

Computer systems of the PC type usually employ a so-called expansion bus to handle various data transfers and transactions related to I/O and disk access. The expansion bus is separate from the system bus or from the bus to which the processor is connected, but is coupled to the system bus by a bridge circuit.

For some time, all PC's employed the ISA (Industry Standard Architecture) expansion bus, which was an 8-Mhz, 16-bit device (actually clocked at 8.33 Mhz). Using two cycles of the bus clock to complete a transfer, the theoretical maximum transfer rate was 8.33 Mbytes/sec. Next, the EISA (Extension to ISA) bus was widely used, this being a 32-bit bus clocked at 8-Mhz, allowing burst transfers at one per clock cycle, so the theoretical maximum was increased to 33 Mbytes/sec. As performance requirements increased, with faster processors and memory, and increased video bandwidth needs, a high performance bus standard was a necessity. Several standards were proposed, including a Micro Channel architecture which was a 10-Mhz, 32-bit bus, allowing 40 MByte/sec, as well as an enhanced Micro Channel using a 64-bit data width and 64-bit data streaming, theoretically permitting 80-to-160 Mbyte/sec transfer. The requirements imposed by the use of video and graphics transfer on networks, however, necessitate even faster transfer rates. One approach was the VESA (Video Electronics Standards Association) bus which was a 33 Mhz, 32-bit local bus standard specifically for a 486 processor, providing a theoretical maximum transfer rate of 132 Mbyte/sec for burst, or 66 Mbyte/sec for non-burst; the 486 had limited burst transfer capability. The VESA bus was a short-term solution as higher-performance processors, e.g., the Intel P5 and P6 or Pentium and Pentium Pro processors, became the standard.

The PCI (Peripheral Component Interconnect) bus was proposed by Intel as a longer-term solution to the expansion bus standard, particularly to address the burst transfer issue. The original PCI bus standard has been upgraded several times, with the current standard being Revision 2.1, available from a trade association group referred to as PCI Special Interest Group, P.O. Box 14070, Portland, Oreg. 97214. The PCI Specification, Rev. 2.1, is incorporated herein by reference. Construction of computer systems using the PCI bus, and the PCI bus itself, are described in many publications, including "PCI System Architecture," 3rd Ed., by Shanley et al., published by Addison-Wesley Pub. Co., also incorporated herein by reference. The PCI bus provides for 32-bit or 64-bit transfers at 33- or 66-Mhz; it can be populated with adapters requiring fast access to each other and/or with system memory, and that can be accessed by the host processor at speeds approaching that of the processor's native bus speed. A 64-bit, 66-MHz PCI bus has a theoretical maximum transfer rate of 528 MByte/sec. All read and write transfers over the bus can be burst transfers. The length of the burst can be negotiated between initiator and target devices, and can be any length.

System and component manufacturers have implemented PCI bus interfaces in various ways. For example, Intel Corporation manufactures and sells a PCI Bridge device under the part number 82450GX, which is a single-chip host-to-PCI bridge, allowing CPU-to-PCI and PCI-to-CPU transactions, and permitting up to four P6 processors and two PCI bridges to be operated on a system bus. Another example, offered by VLSI Technology, Inc., is a PCI chipset under the part number VL82C59x SuperCore, providing logic for designing a Pentium based system that uses both PCI and ISA buses. The chipset includes a bridge between the host bus and the PCI bus, a bridge between the PCI bus and the ISA bus, and a PCI bus arbiter. Posted memory write buffers are provided in both bridges, and provision is made for Pentium's pipelined bus cycles and burst transactions.

The "Pentium Pro" processor, commercially available from Intel Corporation uses a processor bus structure as defined in the specification for this device, particularly as set forth in the publication "Pentium Pro Family Developer's Manual" Vols. 1–3, Intel Corp., 1996, available from McGraw-Hill, and incorporated herein by reference; this manual is also available from Intel by accessing <http://www.intel.com>.

A CPU operates at a much faster clock rate and data access rate than most of the resources it accesses via a bus. In earlier processors, such as those commonly available when the ISA bus and EISA bus were designed, this delay in reading data from a resource on the bus was handled by wait states. When a processor requested data that was not immediately available due to a slow memory or disk access, then the processor merely marked time using wait states, doing no useful work, until the data finally became available. In order to make use of this delay time, a processor such as the P6 provides a pipelined bus that allows multiple transactions to be pending on the bus at one time, rather than requiring one transaction to be finished before starting another. Also, the P6 bus allows split transactions, i.e., a request for data may be separated from the delivery of the data by other transactions on the bus. The P6 processor uses a technique referred to as a "deferred transaction" to accomplish the split on the bus. In a deferred transaction, a processor sends out a read request, for example, and the target sends back a "defer" response, meaning that the target will send the data onto the bus, on its own initiative, when the data becomes available. Another transaction available on the P6 bus is a "retry" response. If a target is not able to supply a requested item, the target may respond to the request from the processor using a retry signal, and in that case the processor will merely send the request again the next time it has access to the bus.

The PCI bus specification as set forth above does not provide for deferred transactions. There is no mechanism for issuing a "deferred transaction" signal, nor for generating the deferred data initiative. Accordingly, while a P6 processor can communicate with resources such as main memory that are on the processor bus itself using deferred transactions, this technique is not employed when communicating with disk drives, network resources, compatibility devices, etc., on an expansion bus.

In existing computer systems read and write transactions commonly run from an initiator on one bus to a target on another bus. These transactions commonly traverse through a bus-to-bus bridge which connects the two buses. A bus may contain a number of slots which may be filled by devices which are potential initiators or targets. A number of problems may arise which cause a particular bus to become inoperable. One common situation is for a bus hang condition to arise which may occur, for example, in the common IRDY bus hang situation. Once the bus recognizes an error condition, the transaction which gave rise to the error could be aborted. However, this may not always cure the problem.

Thus, it would be desirable to determine the cause of the problem and to attempt to overcome it if possible. This type of diagnostic procedure may be complicated by the fact that it is necessary to access the troubled bus in order to obtain information about the nature of the problem which has occurred. For example, devices which are on the bus may contain information about the transactions which occurred previously. This information may provide useful information for determining the source of the problem and perhaps even the nature of the problem. When the bus is inoperative, there may be no way for the internal system to determine how to correct itself. As a result, many error conditions result in system crashes. System crashes generally necessitate a visit from a repair technician and often entail considerable downtime for the entire system.

Another issue which arises in many current computer systems involves bridges which include devices which may be either initiators or targets of transactions being run on particular buses. Generally, a transaction passing through a bridge is run on a connected bus. Because of the way the buses operate, a signal is sent out on the bus to a target device but the signal also proceeds to the end of the bus and is reflected back. The signal that the target device receives is a combination of the initial wave and the reflected wave. As a result, the signal integrity of the received signals may be less for devices resident on the bridge itself, because those devices receive the reflected signal with the longest delay. As a result, the signal received by bridge resident targets may have integrity problems because of the considerable delay between receipt of the initial signal and the reflected signal.

There is a considerable need for a computer system which facilitates the correction of bus errors and which improves the integrity of bus signals.

SUMMARY OF THE INVENTION

In accordance with one aspect of the present invention, a computer system includes a processor and a bridge communicating with the processor. There is a target and an initiator on a bus. A communication path is provided for transactions from said initiator directly to the target without using the bus.

In accordance with another aspect of the present invention, a bridge for a computer system includes an initiator and a target connectable to the same bus and located within the bridge. A path for communicating bus transactions directly to the target without using the bus is provided.

In accordance with still another aspect of the present invention, a method of processing transactions between an initiator and a target on a bus includes the step of initiating a transaction from the initiator and receiving the transaction to a bridge. The transaction is then driven directly to the target without using the second bus.

In accordance with yet another aspect of the present invention, a method of processing transactions between an initiator and a target on a bus includes the step of initiating a transaction from the initiator directed to the target on the bus. The transaction is received in a bridge which also includes the target. The transaction is issued from the bridge to the bus. The transaction is also driven directly to the target without using the bus.

DESCRIPTION OF A PREFERRED EMBODIMENT

Figure 1:
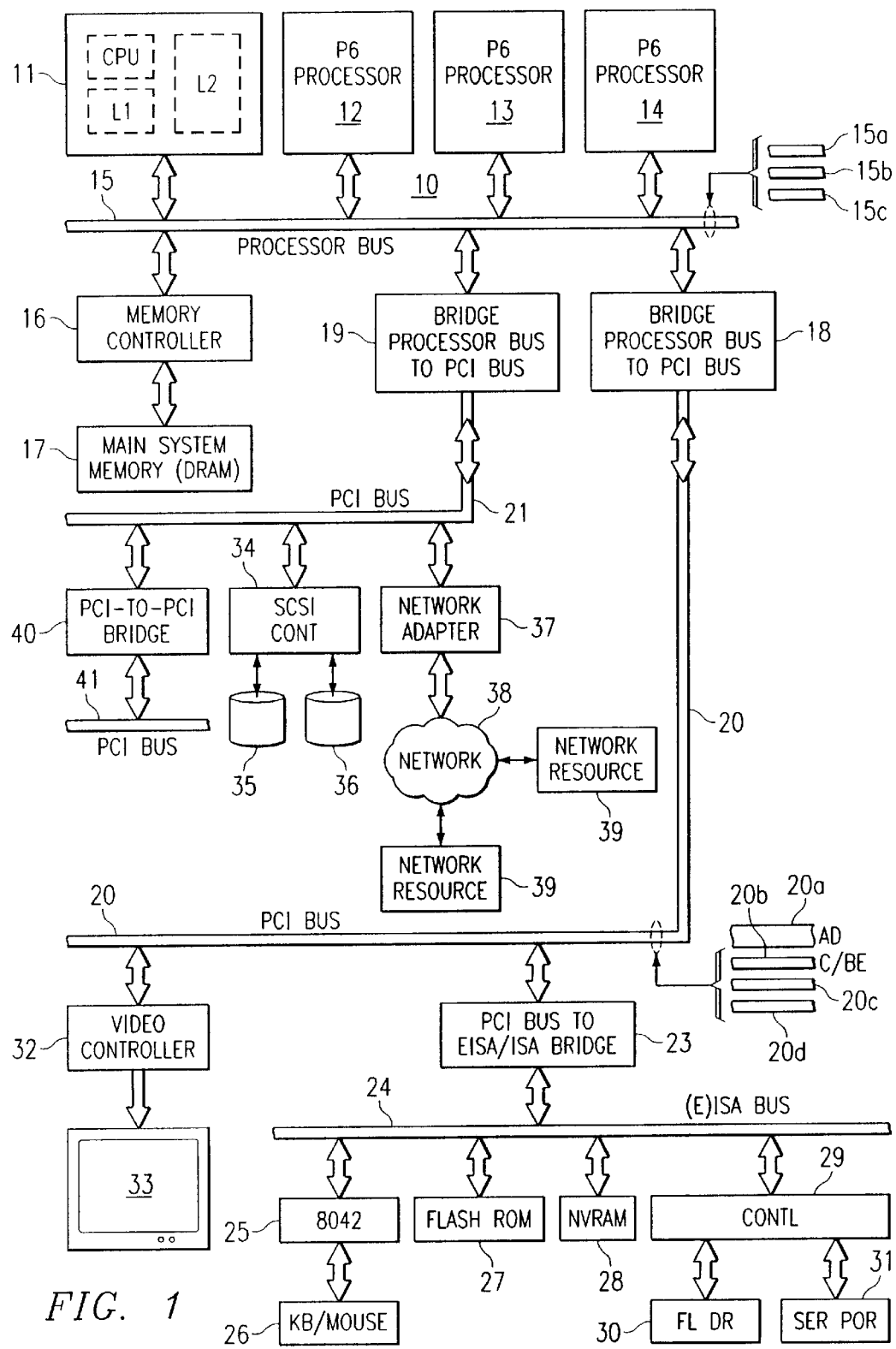
FIG. 1 is a block diagram of one illustrative system that could implement the present invention.

Referring to FIG. 1, a computer system 10 is shown which may use features of the invention, according to one embodiment. The system includes multiple processors 11, 12, 13 and 14 in this example, although the improvements may be used in a single processor environment. The processors are of the type manufactured and sold by Intel Corporation under the trade name "Pentium Pro," although the processors are also referred to as "P6" devices. The structure and operation of these processors 11, 12, 13, and 14 are described in detail in the above-mentioned Intel publications, as well as in numerous other publications.

The processors are connected to a processor bus 15 which is generally of the structure specified by the processor specification, in this case a Pentium Pro specification. The bus 15 operates from the processor clock, so if the processors are 166 MHz or 200 MHz devices, for example, then the bus 15 is operated on some multiple of the base clock rate. The main memory is shown connected to the processor bus 15, and includes a memory controller 16 and DRAM memory 17. The processors 11, 12, 13, and 14 each have a level-two cache L2 as a separate chip within the same package as the CPU chip itself, and of course the CPU chips have level-one L1 data and instruction caches included on-chip.

According to the invention, a bridge 18 or 19 is provided between the processor bus 15 and a PCI bus 20 or 21. Two bridges 18 and 19 are shown, although it is understood that many systems would require only one, and other systems may use more than two. In one example, up to four of the bridges may be used. The reason for using more than one bridge is to increase the potential data throughput. A PCI bus, as mentioned above, is a standardized bus structure that is built according to a specification agreed upon by a number of equipment manufacturers so that cards for disk controllers, video controllers, modems, network cards, and the like can be made in a standard configuration, rather than having to be customized for each system manufacturer. One of the bridges 18 or 19 is the primary bridge, and the remaining bridges (if any) are designated secondary bridges. The primary bridge 18 in this example carries traffic for the "legacy" devices such as (E)ISA bus, 8259 interrupt controller, VGA graphics, IDE hard disk controller, etc. The secondary bridge 19 does not usually incorporate any PC legacy items.

All traffic between devices on the concurrent PCI buses 20 and 21 and the system memory 17 must traverse the processor bus 15. Peer-to-peer transactions are allowed between a master and target device on the same PCI bus 20 or 21; these are called "standard" peer-to-peer transactions. Transactions between a master on one PCI bus and a target device on another PCI bus must traverse the processor bus 15, and these are "traversing" transactions; memory and I/O reads and writes are allowed in this case but not locked cycles and some other special events.

In an example embodiment as seen in FIG. 1, PC legacy devices are coupled to the PCI bus 20 by an (E)ISA bridge 23 to an EISA/ISA bus 24. Attached to the bus 24 are components such as a controller 25 (e.g., an 8042) for keyboard and mouse inputs 26, flash ROM 27, NVRAM 28, and a controller 29 for floppy drive 30 and serial/parallel ports 31. A video controller 32 for a monitor 33 is also connected to the bus 20. On the other PCI bus 21, connected by bridge 19 to the processor bus 15, are other resources such as a SCSI disk controller 34 for hard disk resources 35 and 36, and a network adapter 37. A network 38 is accessed by the adapter 37, and a large number of other stations (computer systems) 39 are coupled to the network. Thus, transactions on the buses 15, 20, and 21 may originate in or be directed to another station or server 39 on the network 38. The embodiment of FIG. 1 is that of a server, rather than a standalone computer system, but the bridge features can be used as well in a workstation or standalone desktop computer. The controllers such as 32, 34, and 37 would usually be cards fitted into PCI bus slots on the motherboard. If additional slots are needed, a PCI-to-PCI bridge 40 may be placed on the PCI bus 21 to access another PCI bus 41; this would not provide additional bandwidth, but would allow more adapter cards to be added. Various other server resources can be connected to the PCI buses 20, 21, and 41, using commercially-available controller cards, such as CD-ROM drives, tape drives, modems, connections to ISDN lines for internet access, etc.

The processor bus 15 contains a number of standard signal or data lines as defined in the specification for the Pentium Pro or P6 processor, mentioned above. In addition, certain special signals are included for the unique operation of the bridges 18 and 19, as will be described. The bus 15 contains thirty-three address lines 15a, sixty-four data lines 15b, and a number of control lines 15c. Most of the control lines are not material here and will not be referred to; also, data and address signals have parity lines associated with them which will not be treated here. The control signals of interest here are described in Appendix A, and include the address strobe ADS#, data ready DRDY#, lock LOCK#, data busy DBSY#, defer DEFER#, request command REQ [4:0]# (five lines), response status RS[2:0]#, etc.

The PCI bus 20 (or 21) also contains a number of standard signal and data lines as defined in the PCI specification. This bus is a multiplexed address/data type, and contains sixty-four AD lines 20a, eight command/byte-enable lines 20b, and a number of control lines 20c as will be described. The definition of the control lines of interest here is given in Appendix B, including initiator ready IRDY#, lock P_LOCK#, target ready TRDY#, STOP#, etc. In addition, there are PCI arbiter signals 20d, also described in Appendix B, including request REQx#, grant P_GNTx#, MEMACK#, etc.

Figure 2:
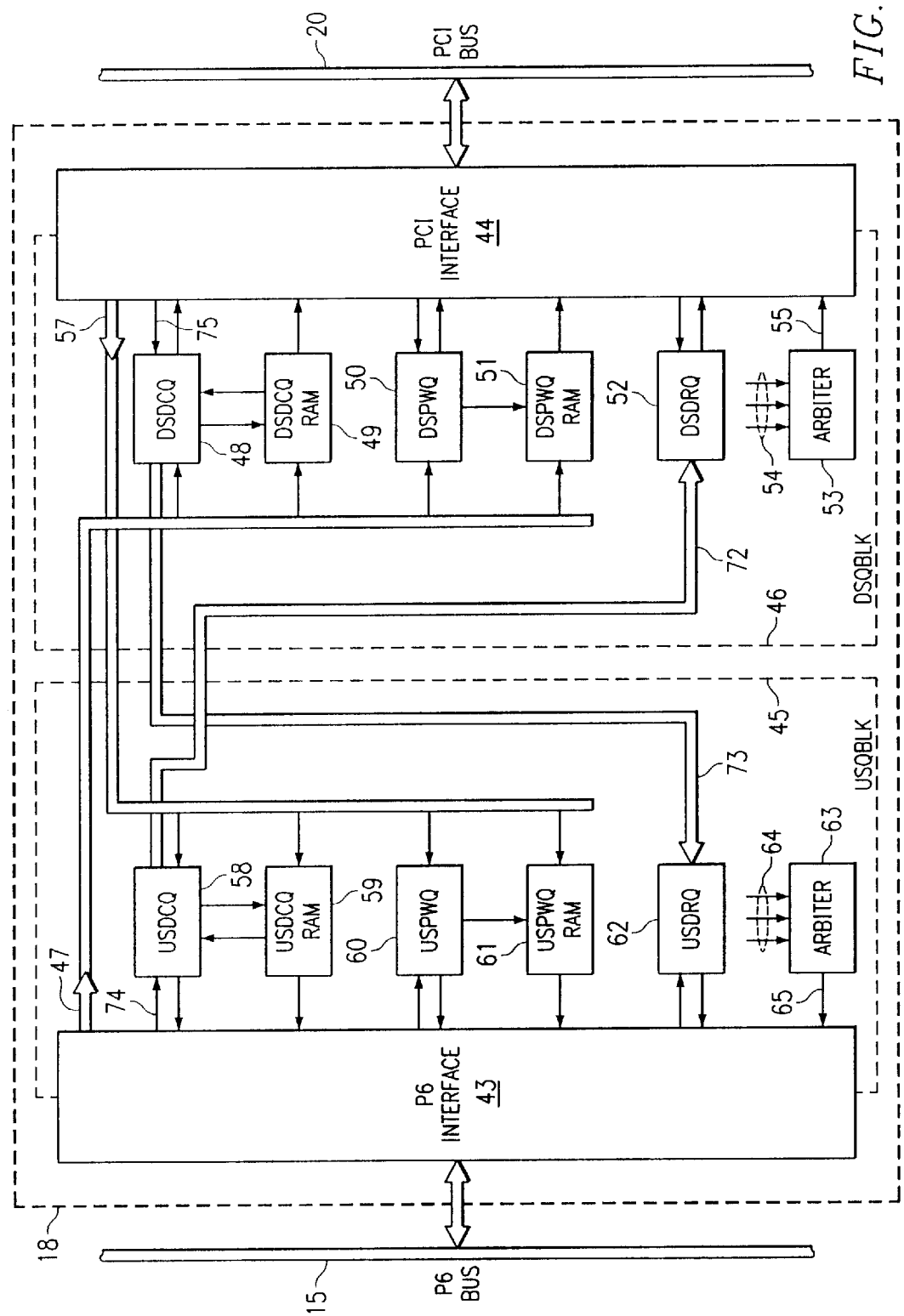
FIG. 2 is a block diagram of the primary and secondary bridges shown in FIG. 1.

Referring to FIG. 2, the bridge circuit 18 (or 19) is shown in more detail. This bridge includes an interface circuit 43 serving to acquire data and signals from the processor bus 15 and to drive the processor bus with signals and data according to Appendix A. An interface 44 serves to drive the PCI bus 20 and to acquire signals and data from the PCI bus according to Appendix B. Internally, the bridge is divided into an upstream queue block 45 (US QBLK) and a downstream queue block 46 (DS QBLK). The term downstream means any transaction going from the processor bus 15 to the PCI bus 20, and the term upstream means any transaction going from the PCI bus back toward the processor bus 15. The bridge interfaces on the upstream side with the processor bus 15 which operates at a bus speed related to the processor clock rate which is, for example, 133 MHz, 166 MHz, or 200 MHz for Pentium Pro processors, whereas it interfaces on the downstream side with the PCI bus which operates at 33 or 66 MHz. Thus, one function of the bridge 18 is that of a buffer between asynchronous buses, and buses which differ in address/data presentation, i.e., the processor bus 15 has separate address and data lines, whereas the PCI bus uses multiplexed address and data lines. To accomplish these translations, all bus transactions are buffered in FIFO's.

For transactions traversing the bridge 18, all memory writes are posted writes and all reads are split transactions. A memory write transaction initiated by a processor device on the processor bus 15 is posted to the interface 43 of FIG. 2 and the processor goes on with instruction execution as if the write had been completed. A read requested by a processor 11-14 is not implemented at once, due to mismatch in the speed of operation of all of the data storage devices (except for caches) compared to the processor speed, so the reads are all treated as split transactions in some manner. An internal bus 47 conveys 1processor bus write transactions or read data from the interface 43 to a downstream delayed completion queue DSDCQ 48 and a RAM 49 for this queue, or to a downstream posted write queue 50 and a RAM 51 for this queue. Read requests going downstream are stored in a downstream delayed request queue DSDRQ 52. An arbiter 53 monitors all pending downstream posted writes and read requests via valid bits on lines 54 in the downstream queues and schedules which one will be allowed to execute next on the PCI bus according to the read and write ordering rules set forth in the PCI bus specification. Commands to the interface 44 from the arbiter 53 are on lines 55.

The components of upstream queue block 45 are similar to those of the downstream queue block 46, i.e., the bridge 18 is essentially symmetrical for downstream and upstream transactions. A memory write transaction initiated by a device on the PCI bus 20 is posted to the PCI interface 44 of FIG. 2 and the master device proceeds as if the write had been completed. A read requested by a device on the PCI bus 20 is not implemented at once by a target device on the processor bus 15, so these reads are again treated as delayed transactions. An internal bus 57 conveys PCI bus write transactions or read data from the interface 44 to an upstream delayed completion queue USDCQ 58 and a RAM 59 for this queue, or to an upstream posted write queue 60 and a RAM 61 for this queue. Read requests going upstream are stored in an upstream delayed request queue USDRQ 62. An arbiter 63 monitors all pending upstream posted writes and read requests via valid bits on lines 64 in the upstream queues and schedules which one will be allowed to execute next on the processor bus according to the read and write ordering rules set forth in the PCI bus specification. Commands to the interface 43 from the arbiter 63 are on lines 65.

The structure and functions of the FIFO buffers or queues in the bridge 18 will now be described. Each buffer in a delayed request queue, i.e., DSDRQ 52 or USDRQ 62, stores a delayed request that is waiting for execution, and this delayed request consists of a command field, an address field, a write data field (not needed if this is a read request), and a valid bit. The upstream USDRQ 62 holds requests originating from masters on the PCI bus and directed to targets on the processor bus 15 and has eight buffers (in an example embodiment), corresponding one-to-one with eight buffers in the downstream delayed completion queue DSDCQ 48. The downstream delayed request queue DSDRQ 52 holds requests originating on the processor bus 15 and directed to targets on the PCI bus 20 and has four buffers, corresponding one-to-one with four buffers in the upstream delayed completion queue USDCQ 58. The DSDRQ 52 is loaded with a request from the interface 43 via bus 72 and the USDCQ 58. Similarly, the USDRQ 62 is loaded from interface 44 via bus 73 and DSDCQ 48. The reason for going through the DCQ logic is to check to see if a read request is a repeat of a request previously made. Thus, a read request from the bus 15 is latched into the interface 43 in response to an ADS#, capturing an address, a read command, byte enables, etc. This information is applied to the USDCQ 58 via lines 74, where it is compared with all enqueued prior downstream read requests; if it is a duplicate, this new request is discarded if the data is not available to satisfy the request, but if it is not a duplicate, the information is forwarded to the DSDRQ 52 via bus 72. The same mechanism is used for upstream read requests; information defining the request is latched into interface 44 from bus 20, forwarded to DSDCQ 48 via lines 75, and if not a duplicate of an enqueued request it is forwarded to USDRQ 62 via bus 73.

The delayed completion queues each include a control block 48 or 58 and a dual port RAM 49 or 59. Each buffer in a DCQ stores completion status and read data for one delayed request. When a delayable request is sent from one of the interfaces 43 or 44 to the queue block 45 or 46, the first step is to check within the DCQ 48 or 58 to see if a buffer for this same request has already been allocated. The address and the commands and byte enables are checked against the eight buffers in DCQ 48 or 58. If not a match, then a buffer is allocated (if one is available) the request is delayed (or deferred for the bus 15), and the request is forwarded to the DRQ 52 or 62 in the opposite side via lines 72 or 73. This request is run on the opposite bus, under control of the arbiter 53 or 63, and the completion status and data are forwarded back to the DCQ 48 or 58 via bus 47 or 57. After status/data are placed in the allocated buffer in the DCQ in this manner, this buffer is not valid until ordering rules are satisfied; e.g., a write cannot be completed until previous reads are completed. When a delayable request "matches" a DCQ buffer and the requested data is valid, then the request cycle is ready for immediate completion.

The downstream DCQ 48 stores status/read data for PCI-to-host delayed requests, and the upstream DCQ 58 stores status/read data for Host-to-PCI delayed or deferred requests. Each DSDCQ buffer stores eight cache lines (256-bytes of data), and there are eight buffers (total data storage=2 K-Byte). The four buffers in the upstream DCQ 58, on the other hand, each store only 32-Bytes of data, a cache line (total data storage=128-Bytes). The upstream and downstream operation is slightly different in this regard. The bridge control circuitry causes prefetch of data into the DSDCQ buffers 48 on behalf of the master, attempting to stream data with zero wait states after the delayed request completes. DSDCQ buffers are kept coherent with the host bus 15 via snooping, which allows the buffers to be discarded as seldom as possible. Requests going the other direction are not subjected to prefetching, however, since many PCI memory regions have "read side effects" (e.g., stacks and FIFO's) the bridge never prefetches data into these buffers on behalf of the master, and USDCQ buffers are flushed as soon as their associated deferred reply completes.

The posted write queues each contain a control block 50 or 60 and a dual port RAM memory 51 or 61, with each one of the buffers in these RAMs storing command and data for one write. Only memory writes are posted, i.e., writes to I/O space are not posted. Because memory writes flow through dedicated queues within the bridge, they cannot blocked by delayed requests that precede them; this is a requirement of the PCI specification. Each of the four buffers in DSPWQ 50, 51 stores 32-Bytes of data plus commands for a host-to-PCI write; this is a cache line—the bridge might receive a cacheline-sized write if the system has a PCI video card that supports the $p^A$ USWC memory type. The four buffers in the DSPWQ 50, 51 provide a total data storage of 128-Bytes. Each of the four buffers in USPWQ 60, 61 stores 256-Bytes of data plus commands for a PCI-to-host write; this is eight cache lines (total data storage=1-KByte). Burst memory writes that are longer than eight cache lines can cascade continuously from one buffer to the next in the USPWQ. Often, an entire page (e.g., 4-KB) is written from disk to main memory in a virtual memory system that is switching between tasks; for this reason, the bridge has more capacity for bulk upstream memory writes than for downstream.

The arbiters 53 and 63 control event ordering in the QBLKs 45 and 46. These arbiters make certain that any transaction in the DRQ 52 or 62 is not attempted until posted writes that preceded it are flushed, and that no datum in a DCQ is marked valid until posted writes that arrived in the QBLK ahead of it are flushed.

Figure 3A:
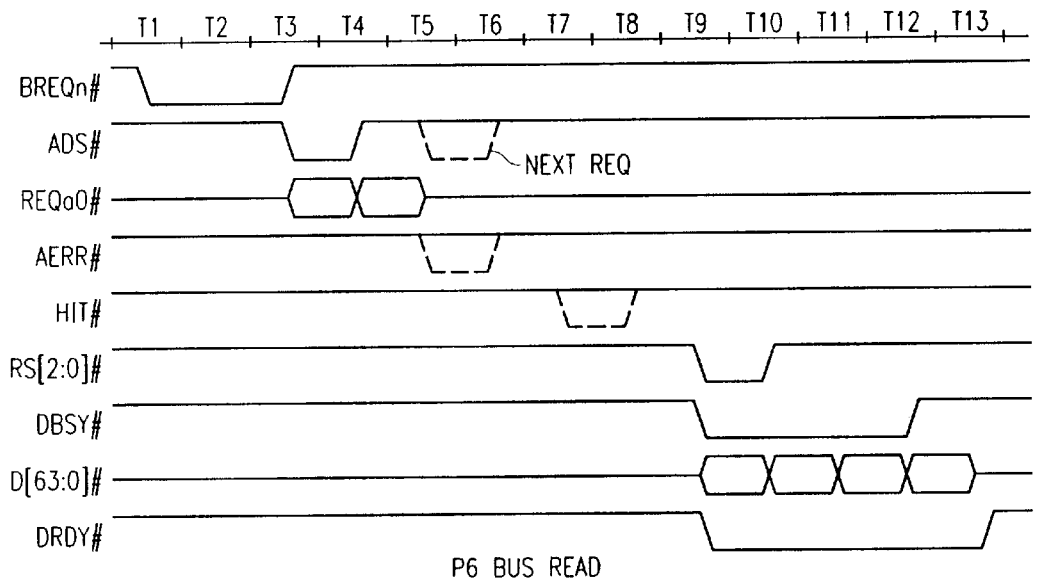
FIG. 3a–3g are timing diagrams showing events occurring on the buses in the system of FIG. 1.

Referring to FIG. 3a, the data and control signal protocol on the bus 15 is defined by the processors 11–14, which in the example are Intel "Pentium Pro" devices. The processors 11–14 have a bus interface circuit within each chip which provides the bus arbitration and snoop functions for the bus 15. A P6 bus cycle includes six phases: an arbitration phase, a request phase, an error phase, a snoop phase, a response phase, and a data phase. A simple read cycle where data is immediately available (i.e., a read from main memory 17) is illustrated in FIG. 3a. This read is initiated by first acquiring the bus; a bus request is asserted on the BREQn# line during T1; if no other processors having a higher priority (using a rotating scheme) assert their BREQn#, a grant is assumed and an address strobe signal ADS# is asserted in T2 for one clock only. The address, byte enables and command signals are asserted on the A# lines, beginning at the same time as ADS#, and continuing during two cycles, T3 and T4, i.e., the asserted information is multiplexed onto the A# lines in two cycles. During the first of these, the address is applied, and during the second, the byte enables and the commands are applied. The error phase is a parity check on the address bits, and if a parity error is detected an AERR# signal is asserted during T5, and the transaction aborts. The snoop phase occurs during T7; if the address asserted during T3 matches the tag of any of the L2 cache lines and is modified, or any other resource on bus 15 for which coherency is maintained, a HITM# signal is asserted during T7, and a writeback must be executed before the transaction proceeds. That is, if the processor 11 attempts to read a location in main memory 17 which is cached and modified at that time in the L2 cache of processor 12, the read is not allowed to proceed until a writeback of the line from L2 of processor 12 to memory 17 is completed, so the read is delayed. Assuming that no parity error or snoop hit occurs, the transaction enters the response phase during T9. On lines RS[2:0]#, a response code is asserted during T9; the response code indicates "normal data," "retry," "deferred," etc., depending on when the data is going to be available in response to the read request. Assuming the data is immediately available, the response code is "normal data" and the data itself is asserted on data lines D[63:0]# during T9 and T12 (the data phase); usually a read request to main memory is for a cache line, 128-bytes, so the cache line data appears on the data lines during two cycles, 64-bytes each cycle, as shown. The data bus busy line DBSY# is sampled before data is asserted, and if free then the responding agent asserts DBSY# itself during T9–T11 to hold the bus, and asserts data ready on the DRDY# line to indicate that valid data is being applied to the data lines.

Several read requests can be pending on the bus 15 at the same time. That is, another request can be asserted by any agent which is granted the bus (the same processor, or by a different processor), during T5, indicated by dotted lines for the ADS# signal, and the same sequence of error, snoop, response, and data phases would play out in the same order, as discussed. Up to eight transactions can be pending on the bus 15 at one time. The transactions complete in order unless they are split with a deferred response. Transactions that receive a deferred response may complete out of order.

Figure 3B:
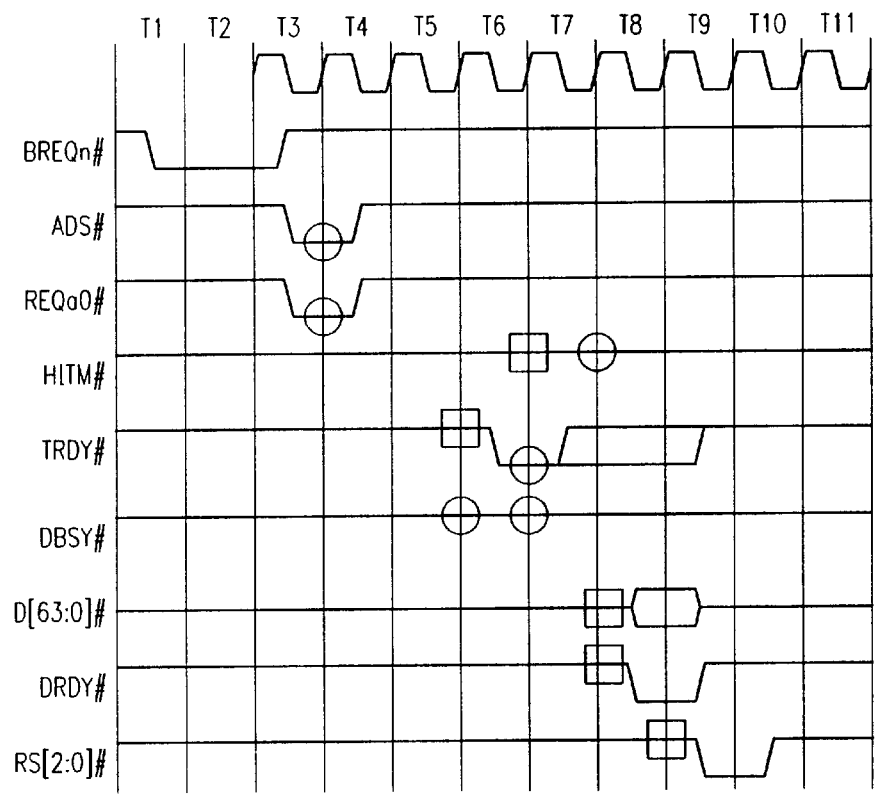

A simple write transaction on the P6 bus 15 is illustrated in FIG. 3b. As in a read transaction, after being granted the bus, in T3 the initiator asserts ADS# and asserts the REQa0# (command and B/E's). TRDY# is asserted three clocks later in T6. TRDY# is active and DBSY# is inactive in T8, so data transfer can begin in T9; DRDY# is asserted at this time. The initiator drives data onto the data bus D[63:0]# during T9.

Figure 3C:
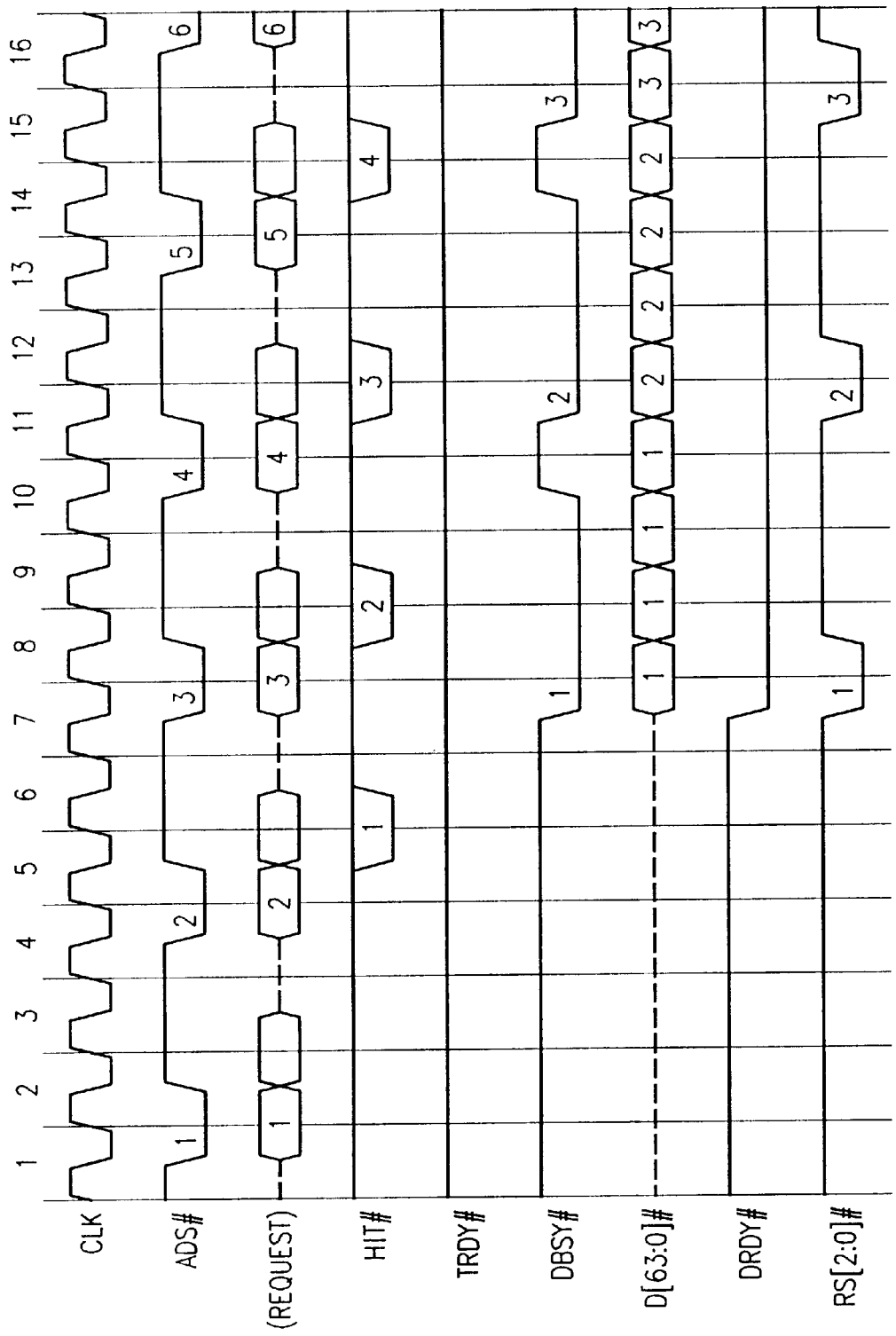

A burst or full-speed read transaction is illustrated in FIG. 3c. Back-to-back read data transfers from the same agent with no wait states. Note that the request for transaction-4 is being driven onto the bus while data for transaction-1 is just completing in T10, illustrating the overlapping of several transactions. DBSY# is asserted for transaction-1 in T7 and remains asserted until T10. Snoop results indicate no implicit writeback data transfers so TRDY# is not asserted.

Figure 3D:
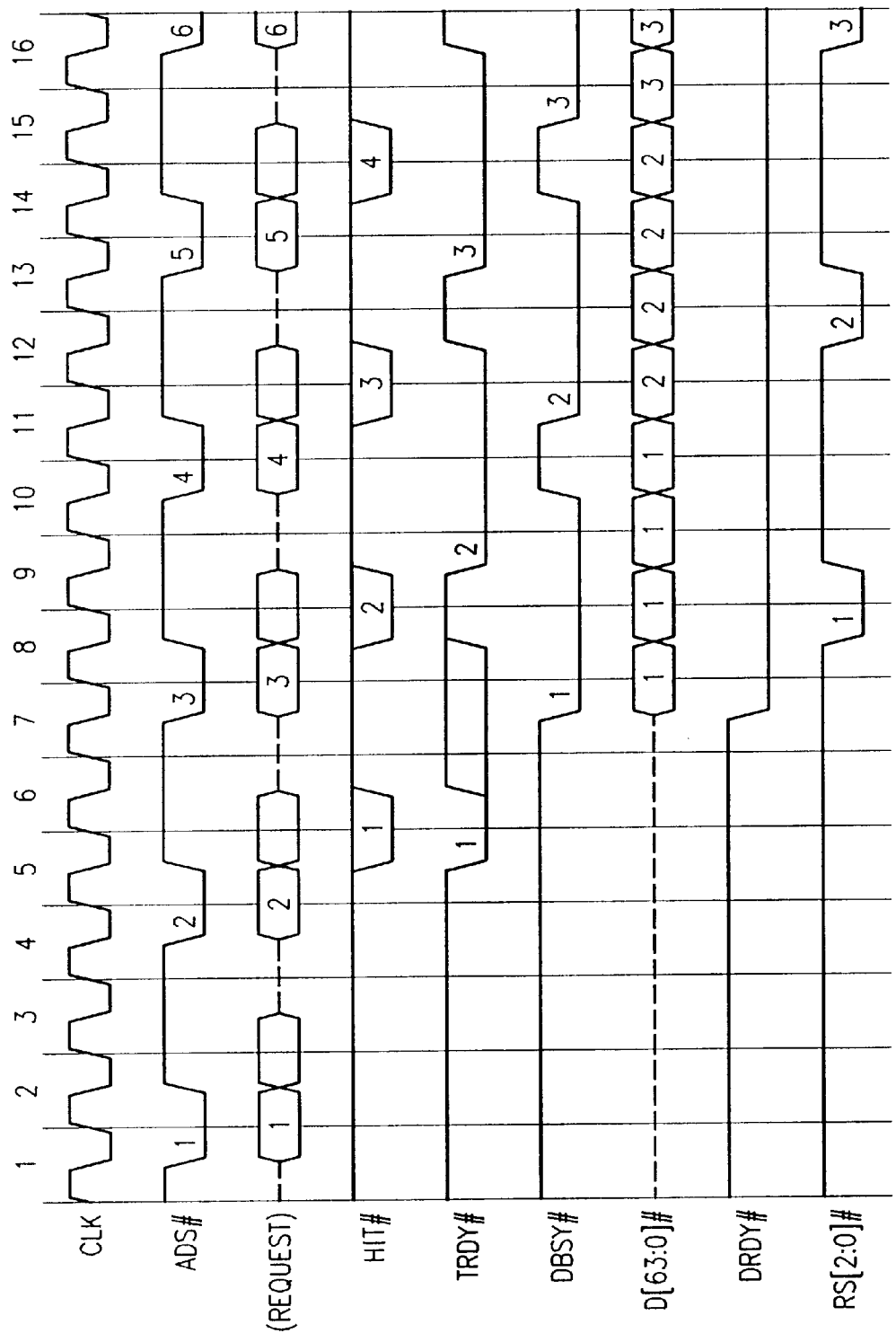

Likewise, a burst or full-speed write transaction with no wait states and no implicit writebacks is illustrated in FIG. 3d. TRDY# for transaction-2 can be driven the cycle after RS[2:0]# is driven. In T11, the target samples TRDY# active and DBSY# inactive and accepts data transfer starting in T12. Because the snoop results for transaction-2 have been observed in T9, the target is free to drive the response in T12.

Figure 3E:
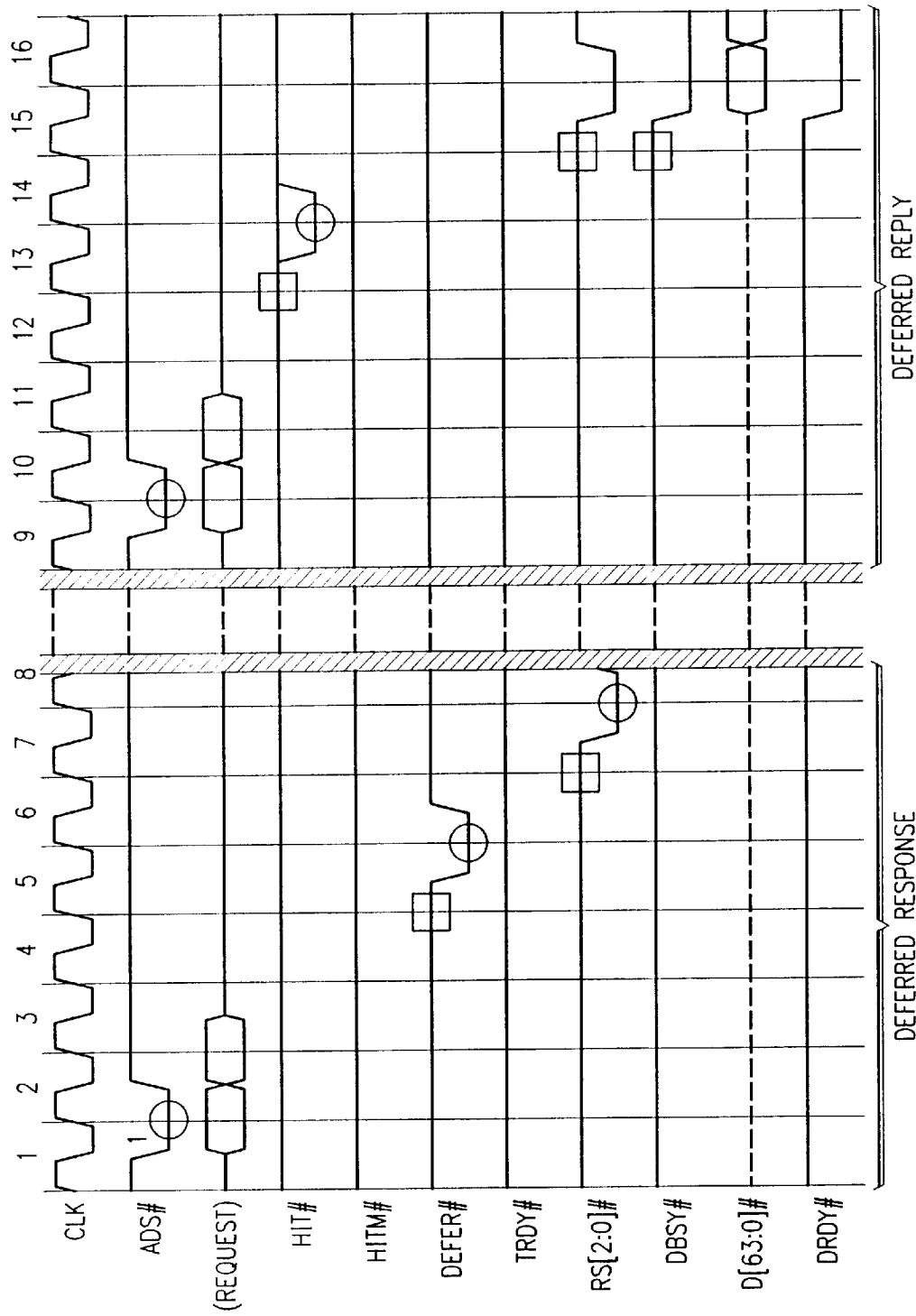

A deferred read transaction is illustrated in FIG. 3e. This is a split transaction, meaning the request is put out on the bus, then at some time later the target initiates a reply to complete the transaction, while other transactions occur on the bus in the intervening time. Agents use the deferred response mechanism of the P6 bus when an operation has significantly greater latency than the normal in-order response. During the request phase on the P6 bus 15, an agent can assert Defer Enable DEN# to indicate if the transaction can be given a deferred response. If DEN# is inactive, the transaction cannot receive a deferred response; some transactions must always be issued with DEN# inactive, e.g., bus-locked transactions, deferred replies, writebacks. When DEN# is inactive, the transaction may be completed in-order or it may be retried, but it cannot be deferred. A deferred transaction is signalled by asserting DEFER# during the snoop phase followed by a deferred response in the response phase. On a deferred response, the response agent must latch the deferred ID, DID[7:0]#, issued during the request phase, and after the response agent completes the original request, it must issue a matching deferred-reply bus transaction, using the deferred ID as the address in the reply transaction's request phase. The deferred ID is eight bits transferred on pins Ab[23:16] in the second clock of the original transaction's request phase.

Figure 3F:
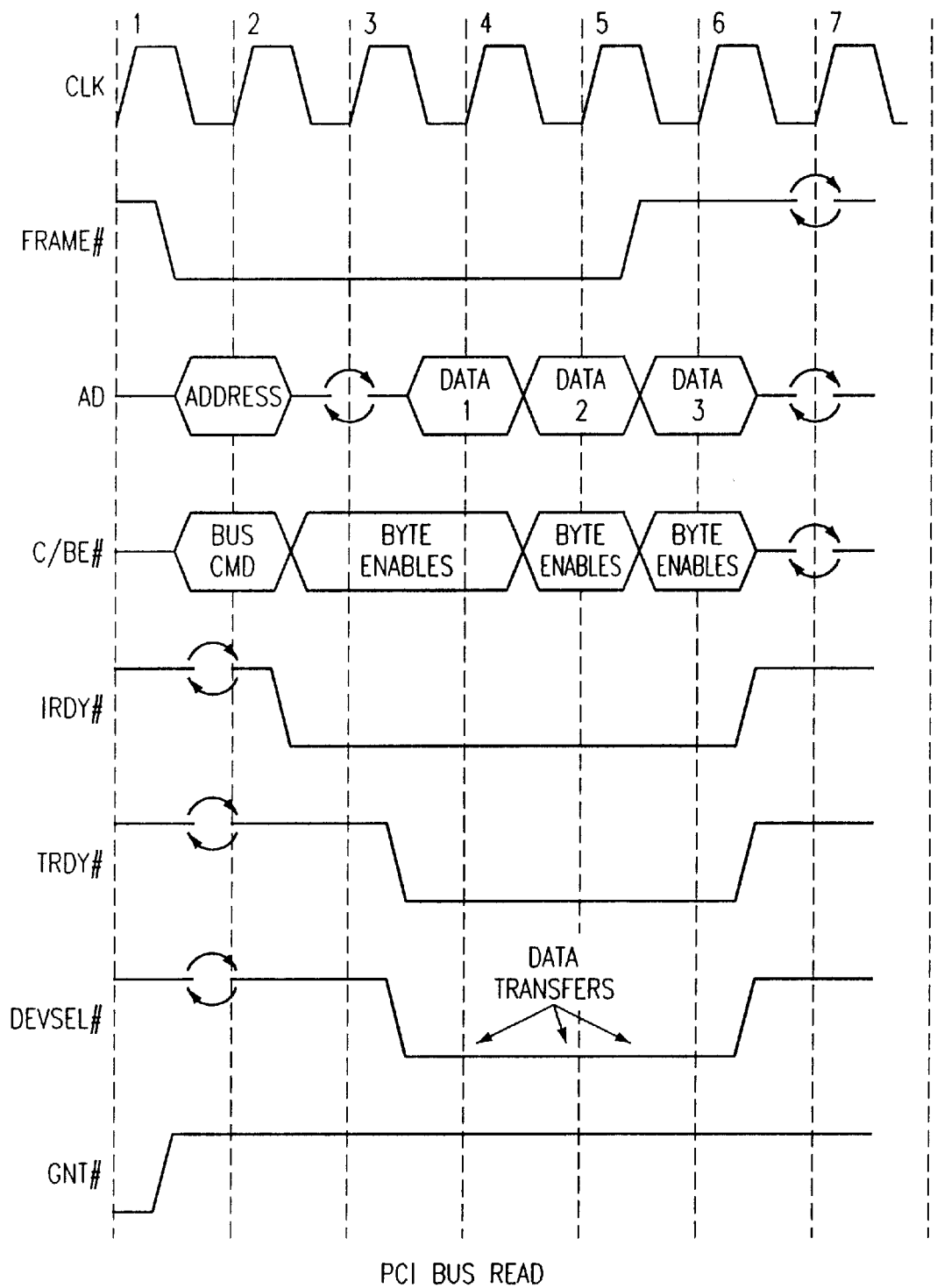
Figure 3G:
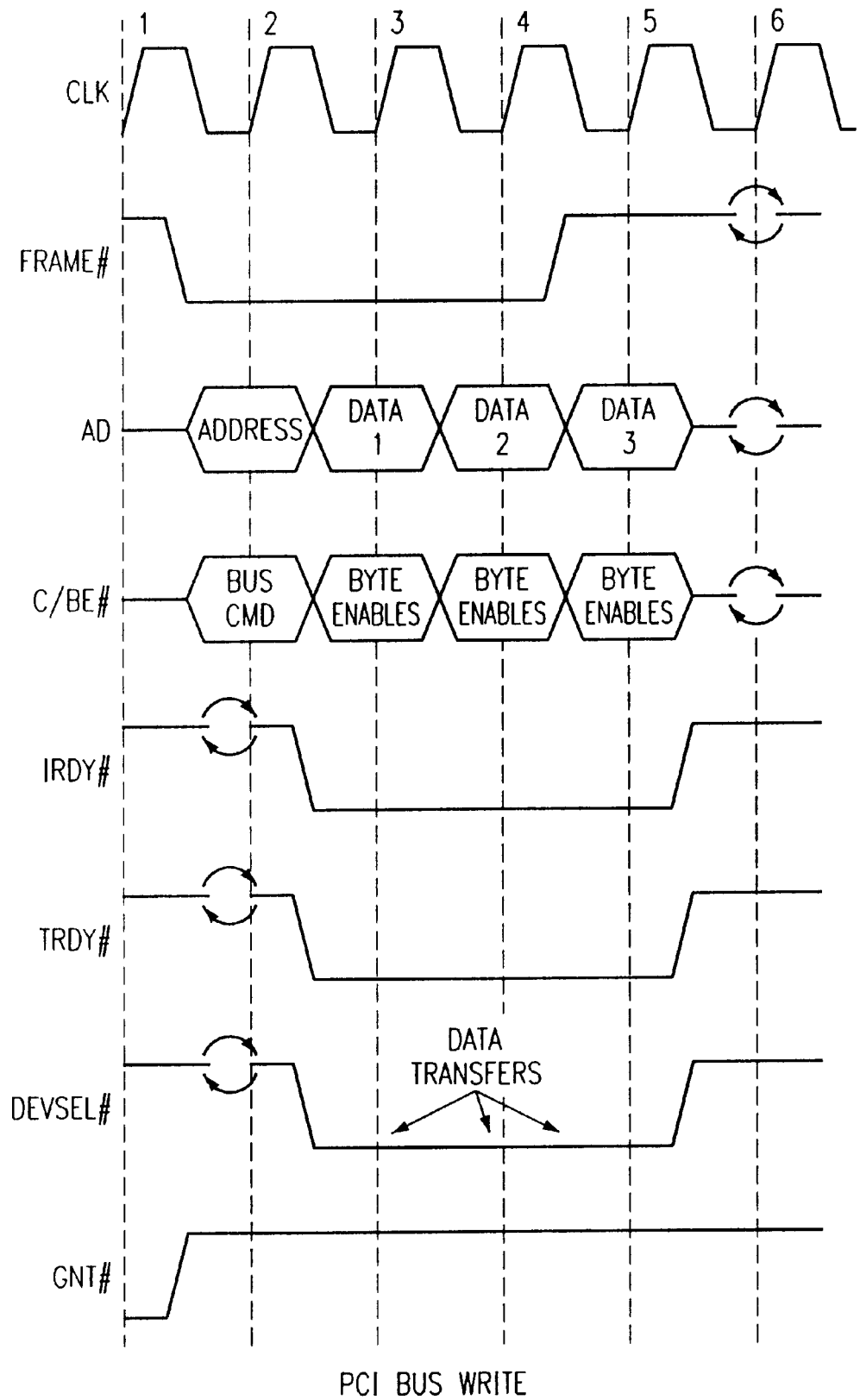

A read transaction on the PCI bus 20 (or 21) is illustrated in FIG. 3f. It is assumed that the bus master has already arbitrated for and been granted access to the bus. The bus master must then wait for the bus to become idle, which is done by sampling FRAME# and IRDY# on the rising edge of each clock (along with GNT#); when both are sampled deasserted, the bus is idle and a transaction can be initiated by the bus master. At start of clock T1, the initiator asserts FRAME#, indicating that the transaction has begun and that a valid start address and command are on the bus. FRAME# must remain asserted until the initiator is ready to complete the last data phase. When the initiator asserts FRAME#, it also drives the start address onto the AD bus and the transaction type onto the Command/Byte Enable lines, C/BE [3:0]#. A turn-around cycle (i.e., a dead cycle) is required on all signals that may be driven by more than one PCI bus agent, to avoid collisions. At the start of clock T2, the initiator ceases driving the AD bus, allowing the target to take control of the AD bus to drive the first requested data item back to the initiator. Also at the start of clock T2, the initiator ceases to drive the command onto the C/BE lines and uses them to indicate the bytes to be transferred in the currently addressed doubleword (typically, all bytes are asserted during a read). The initiator also asserts IRDY# during T2 to indicate it is ready to receive the first data item from the target. The initiator asserts IRDY# and desserts FRAME# to indicate that it is ready to complete the last data phase (T5 in FIG. 3f). During clock T3, the target asserts DEVSEL# to indicate that it recognized its address and will participate in the transaction, and begins to drive the first data item onto the AD bus while it asserts TRDY# to indicate the presence of the requested data. When the initiator sees TRDY# asserted in T3 it reads the first data item from the bus. The initiator keeps IRDY# asserted upon entry into the second data phase in T4, and does not deassert FRAME#, indicating it is ready to accept the second data item. In a multiple data phase transaction (e.g., a burst), the target latches the start address into an address counter, and increments this address to generate the subsequent addresses.

Figure 4:
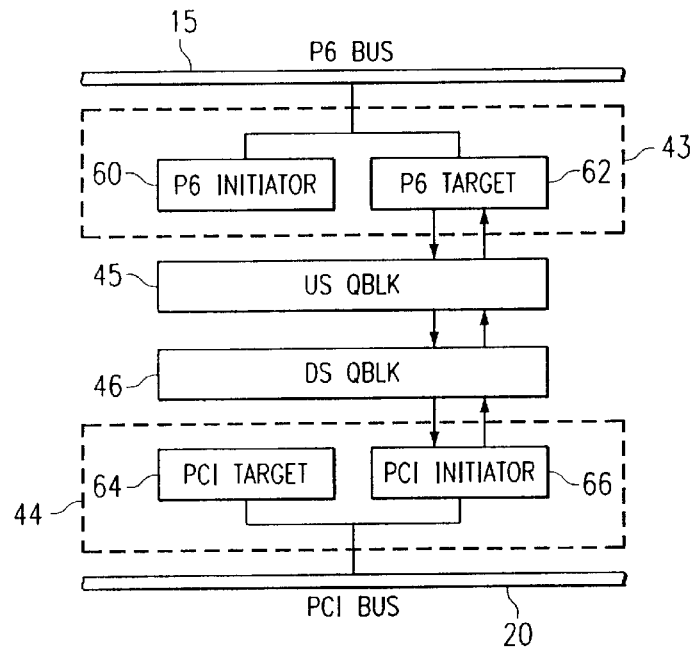
FIG. 4 is a block diagram corresponding to FIG. 2.

Referring now to FIG. 4, the processor bus 15 is connected through the processor bus interface 43, the upstream queue block 45, the downstream queue block 46 and the PCI interface 44 to the PCI bus 20. The processor bus interface 43 includes a processor bus initiator 60 and a processor bus target 62. The target 62 is capable of two-way communications with the upstream queue block 45. Similarly, the PCI initiator 66 communicates with the downstream queue block 46. The PCI initiator 66 and PCI target 64 are part of the PCI interface 44.

Figure 5:
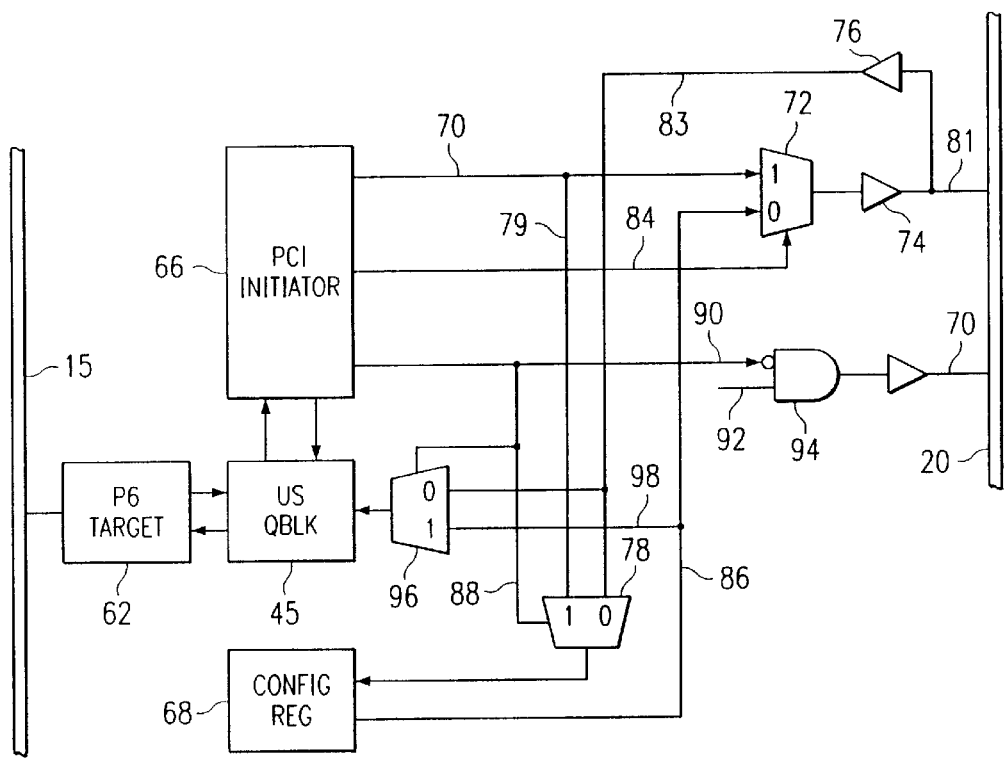
FIG. 5 is a block diagram of one implementation of the present invention.

Referring to FIG. 5, the PCI initiator 66 and processor target 62 are shown to better explain the relationship with certain transactions on the PCI bus 20. Also depicted is a configuration module 68 which may be implemented as part of the PCI bus interface 44. It may include configuration, diagnostic and/or memory mapped registers.

The PCI initiator 66 may initiate a transaction which originally was run on the processor bus 15 and which is transferred to the PCI initiator 66 from the processor bus target 62. As indicated in FIG. 5, the processor bus target 62 may receive a request for a transaction and ultimately provide a response to the processor bus 15. The processor target 62 sends the request through the queue block 45 to the PCI initiator 66. The PCI initiator 66 then runs the transaction on the line 70. The transaction on the line 70 passes through a multiplexor 72 to a bi-directional buffer including the buffers 74 and 76 and out to the PCI bus 20. The same transaction may be bidirectionally routed through the amplifier 76 to a second multiplexor 78.

In certain instances, a new transaction from the initiator 66 would be passed directly through the second multiplexor 78 to the configuration module 68 via the path 79. One instance where this would occur would be when the configuration module 68 was the ultimate target of the transaction being run by the PCI initiator 66. The transaction may then also be run on the PCI bus 20.

In regular transactions data may be returned through the line 81 to the line 83. It may then be blocked by the multiplexor 78 which is switched to only accept inputs from the PCI initiator 66.

The multiplexor 72 is controlled by a signal on the line 84. The multiplexor 72 may be switched by a signal on the line 84 to allow either the PCI initiator 66 or the configuration module 68 via the line 86, to control the PCI bus 20.

Similarly, the multiplexor 78 is controlled by a signal issued from the PCI initiator 66 over the line 88. When desired, the multiplexor 78 may be operable to reject a bidirectional signal from the buffer 76 and to simply pass the original PCI initiator transaction from the line 70 directly to the configuration module 68. In this way, a transaction initiated from the PCI initiator 66 may be run on the PCI bus 20. However, the transaction is also directed straight to the configuration module 68 when it is the intended target.

The configuration module 68 may then respond with data over the lines 86 and 98 to the P6 target 62. Ultimately, this information may get back to the P6 bus 15. In some instances, the data may also be provided, via line 86, to the PCI bus 20 through the multiplexor 72.

When the PCI bus is in a hang or other error condition, there may be critical information stored in the module 68 which could not be accessed via the PCI bus 20. In this case, direct access to the configuration module 68, without using the PCI bus 20, allows critical information to be obtained. The information stored in the module 68 could include a listing of recent transactions including the initiator, the target and the type of command that was involved. This information is useful in determining the cause of the hang condition on the PCI bus 20. It may be utilized to attempt to diagnose the problem and in some cases to even correct the problem without requiring a system shut down.

By running the transaction on the PCI bus at the same time the transaction is directly shunted to the module 68, control over the bus 20 may be maintained. As a result, additional transactions will not occur which would simultaneously target the module 68. Moreover, bus visibility is achieved which may be useful in various operations, including debugging.

Alternatively, transactions from the PCI initiator 66 could be run both on the bus 20 and directly through the module 68 with the return path controlled by the module 68. For example, the module 68 could switch the multiplexer 96 (by a path not shown) when the module 68 claims the cycle.

When the transaction, which is actually being shunted directly to the configuration module 68, is run on the PCI bus by the PCI initiator 66, it may be necessary to mask the ID select signal which would identify the particular target device. This ID select signal would correspond to a multiplexed address in normal PCI terminology. On the PCI bus 20 during configuration cycles, the initiator asserts one address line that corresponds to the target of the configuration cycle. The signal identifies the target device and therefore initiates a response by the target device. Since it would be undesirable for any target to respond (since the configuration module 68 is being addressed directly), this signal from the initiator 66 is masked by the logic gate 94. When the logic gate 94 receives a signal on the line 90 indicating that a direct cycle to the configuration module 68 is being run, the master ID select signal on the line 92 is blocked. This makes all other devices ignore the configuration access that was run on the bus 20. Thus, no target responds to the PCI bus transaction. The arbiters 53, 63 keep the transactions in sync with one another. During normal transactions, the master ID select signal would issue on the bus 20.

The bidirectional signal from the buffer 76 may, under certain circumstances, be passed by the multiplexor 96 to the processor target device 62. Control over the switching operation of the multiplexor 96 may also be obtained via the line 90. Similarly, data and control signals outputted from the configuration module 68 may be shunted directly to upstream queue block 45 and the processor target 62 via the line 98 when the multiplexor 96 is in the appropriate configuration. The signal on the line 90 used to the control the ID select signal also controls the multiplexor 78 and the multiplexor 96.

The configuration module 68 and bridge 18 or 19 may be implemented on one semiconductor die. Alternatively, they may be separate, integrated circuits.

The present invention may enable the diagnosis and repair of bus faults. For example, the configuration module 68 could include a FIFO buffer which stores information about transactions that have occurred previously. For example, the buffer may be a given number of spaces deep and that given number of transactions are stored such that the last several transactions are stored in a shorthand format in the buffer. If the bus hangs, information about the last several transactions can be analyzed. Generally, the failure condition would be detected by a watch dog timer time out indicating that no valid data transfer happened on the bus for a predetermined amount of time (e.g., $2^{18}$ clock cycles). The transaction could then be terminated by asserting STOP# followed by target abort, taking the device off of the bus. A reset could be utilized to see if the bus hang condition had been remedied. If not, an analysis could be made using the stored transaction information in the buffer to determine what was the last device that was involved before the problem arose. The faulty device could then be electronically disconnected from the system and a message could be provided indicating that the faulty device should be replaced. Since the device has now been disconnected it would be possible to continue operation of the bus. A system for implementing such a bus watching functionality is described in a copending U.S. patent application entitled "Fault Isolation," Ser. No. 08/658,750, filed Jun. 5, 1996, in the name of Alan L. Goodrum et al, hereby expressly incorporated by reference herein.

If the stored information about the transactions were inaccessible because of the bus hang condition, there would be no benefit from storing the transactions. Thus, it is advantageous to have a system for enabling such a buffer to be accessed through an alternative route when a bus fault occurs. Those skilled in the art will appreciate a number of other circumstances where it is desirable to be able to access critical information by a separate path not dependent on the active status of any particular bus.

The use of the internal direct path also may eliminate the worst case reflections. Each device on the bus 20, 21 downstream from a bridge 18, 19, shown in FIG. 1, receives a signal and a reflected signal from the end of the bus 20, 21 farthest away from the bridge. The delay from the bridge back to the bridge is the longest delay. Thus, the signal quality is poorest for signals from the bridge 18, 19 back to the same bridge 18, 19. The internal direct path may eliminate these worst case reflections. For this purpose, it is advantageous to use the internal direct path for configuration and memory transactions.

While the present invention has been described with respect to the single preferred embodiment, those skilled in the art will appreciate a number of modifications and variations therefrom. It is intended that the appended claims cover all such modifications and variations as fall within the true spirit and scope of the present invention.

APPENDIX A—P6 Bus Signals

ADS#—Address Strobe, asserted to defines the beginning of the Request Phase. The REQa[4:0]# and Aa[35:3]# signals are valid in the clock that ADS# is asserted (the "a") clock). The REQb[4:0]# and Ab[35:3]# signals are valid in the next clock after ADS# was asserted (the "b") clock).

A[35:3]#—Address signals, conveying information during both clocks of two-clock request phase. Aa[35:3]# are signals during first clock and Ab[35:3]# are signals during second clock. Aa[35:3]# convey address, and Ab[35:3]# convey cycle-type, byte enable, deferred ID, etc.

D[63:0]#—System Data signals—carry the data for a transaction during the data phase.

REQ[4:0]#—Request command signals, asserted during both clocks of the request phase, indicating type of transaction being requested and info about that transaction.

RS[2:0]#—Response status signals, driven by the target during the response phase, indicate how current transaction will be processed. Valid responses include: Normal with or without data; Idle; Retry; Defer; Implicit Writeback.

DBSY#—Data bus busy signal, asserted by the agent driving the data on D[63:0]# to indicate a multi-clock data phase. Asserted on first clock that data may be driven, deasserted when the data bus is no longer needed.

DEFER#—Defer signal, used by target to indicate to the agent issuing the transaction that it may not be completed in order. An active DEFER# means that the associated transaction will complete with a DEFER REPLY or a RETRY response.

DRDY#—Date ready signal, driven in same clock as the D[63:0]# signals and indicates that the data is valid and may be sampled.

TRDY#—Target ready signal, driven by the target for write transactions to indicate that target is ready to accept the current data for a write or writeback.

HIT#—Cache hit signal for snooping, along with HITM# determine results of snoop phase. HITM# is the cache hit to modified signal.

AERR#—Address parity error, driven during error phase.

GNTn#—Arbiter grant signal to master, indicating initiator is granted the bus.

LOCK#—Bus lock signal, asserted from the request phase of the first transaction through the response phase of the final transaction. No other bus masters may issue transactions during a bus lock. Locked cycle may be stopped on the first transaction if DEFER# is asserted, or by error signals.

APPENDIX B—PCI Bus Signals

AD[31:0]—Address/Data (with AD[63:32] for 64-bit bus)conveys the address for a read or write request, then Used to transfer data.

C/BE#[3:0]—Command/Byte Enable (with C/BE#[7:4] for 64-bit bus)—conveys bus commands in first phase then byte enables in later phases.

FRAME#—Asserted by master to begin a transaction. Held in asserted state until transaction is completed.

TRDY#—Target Ready—indicates that target is ready to receive or transfer data.

IRDY#—Initiator Ready—indicates that master or initiator of transaction is ready to send or receive data.

DEVSEL#—Device Select—indicates driving device has decoded its address as the target of the current access. As an input, it indicates whether any device on the bus has been selected.

STOP#—Target is requesting the master to stop the current bus transaction. Aborts.

REQ#—Request—arbitration signal asserted by an initiator when requesting the bus.

GNT#—Grant—signal from arbiter to agent in response to REQ#, indicating that bus has been granted to agent—one of six signals with one going to each device.

LOCK#—Atomic operation, may require multiple transactions to complete, asserted when transaction must be completed before any other transaction can be initiated. Only supported going downstream.

What is claimed is:

1. A computer system comprising:

a processor;

a hard disk drive coupled to said processor;

a bridge coupled to first and second buses, the second bus coupled to said processor;

an alternate path for communicating transactions;

a target in said bridge coupled to said first bus and said alternate path; and an initiator coupled to said first bus and said alternate path, said initiator causing transactions to be simultaneously driven over said first bus and over the alternate path to said target in the bridges, said initiator causing all transactions directed to said target in the bridge to run through said alternate path and causing addressing information of said transactions to be masked on said first bus.

2. The system of claim 1 wherein said first bus is a PCI bus.

3. The system of claim 1 wherein said bridge is formed on a semiconductor die and said target in said bridge is situated on the same die as said bridge.

4. The system of claim 1 wherein said bridge target comprises a configuration module including a store.

5. The system of claim 4 wherein said configuration module stores information which is useful in diagnosing an error condition in said first bus.

6. The system of claim 1 including a device for enabling information to be obtained from said bridge target when said first bus is not working correctly.

7. A method of processing transactions between an initiator and a target on the same bus comprising the steps of:
- initiating a transaction from said initiator intended for said target;
- receiving said transaction in a bridge;
- communicating said transaction over said bus and simultaneously to said target in the bridge over an alternate path; and
- causing all transactions directed to said target in the bridge to be run directly over said alternate path without using said bus while masking addressing information of said transaction on said bus.

8. The method of claim 7 including the step of issuing the transaction from the bridge to the bus.

9. The method of claim 7 including the step of obtaining information useful in diagnosing bus faults by accessing information stored in a register in said target in the bridge.

10. A method of processing transactions between an initiator and a target on the same bus comprising the steps of:
- initiating a transaction from said initiator directed to said target on said bus;
- receiving said transaction in a bridge which also includes a target;
- issuing the transaction from the bridge to said target on said bus and simultaneously driving the transaction to said target in said bridge over an alternate path that does not include said bus; and
- masking addressing information of a said transaction on said bus when said target in the bridge is addressed directly as an intended target.

11. The method of claim 10 including the step of obtaining information useful in diagnosing system faults by accessing information stored in a configuration module register in said target in said bridge.

12. The method of claim 11 wherein the masking step includes the step of masking an ID select signal for the target on said bus.

* * * * *

UNITED STATES PATENT AND TRADEMARK OFFICE
CERTIFICATE OF CORRECTION

PATENT NO. : 6,098,137
DATED : Aug. 1, 2000
INVENTOR(S) : Goodrum, et al.

It is certified that error appears in the above-indentified patent and that said Letters Patent is hereby corrected as shown below:

On the title page, left column, change
"[73] Assignee: Computer Corporation" to
--[73] Assignee: Compaq Computer Corporation--

Signed and Sealed this

Eighth Day of May, 2001

Attest:

NICHOLAS P. GODICI

Attesting Officer      Acting Director of the United States Patent and Trademark Office